(12) United States Patent
Rhoads et al.

(10) Patent No.: US 10,072,969 B2
(45) Date of Patent: *Sep. 11, 2018

(54) NONLINEAR MASS SENSORS BASED ON ELECTRONIC FEEDBACK AND METHODS OF USING THE SAME

(71) Applicant: Purdue Research Foundation, West Lafayette, IN (US)

(72) Inventors: Jeffrey Frederick Rhoads, West Lafayette, IN (US); George Tsu-Chih Chiu, West Lafayette, IN (US); Nikhil Bajaj, West Lafayette, IN (US); Andrew Burke Sabater, Claremont, CA (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/890,448

(22) Filed: Feb. 7, 2018

(65) Prior Publication Data
US 2018/0180466 A1 Jun. 28, 2018

(51) Int. Cl.
*G01H 13/00* (2006.01)
*G01L 9/00* (2006.01)
*G01P 15/097* (2006.01)
*G01P 15/00* (2006.01)

(52) U.S. Cl.
CPC ........... *G01H 13/00* (2013.01); *G01L 9/00* (2013.01); *G01P 15/00* (2013.01); *G01P 15/097* (2013.01)

(58) Field of Classification Search
CPC ....... G01H 13/00; G01P 15/097; G01P 15/00; G01L 9/00
See application file for complete search history.

(56) References Cited

U.S. PATENT DOCUMENTS

| 3,876,843 A * | 4/1975 | Moen | H04R 1/38 381/313 |
|---|---|---|---|
| 7,289,575 B1 * | 10/2007 | Kenington | H03F 1/3241 330/144 |
| 2013/0272532 A1 * | 10/2013 | Mazanec | H04R 25/305 381/60 |
| 2014/0202260 A1 * | 7/2014 | Nakamura | B81B 3/0021 73/862.59 |

* cited by examiner

*Primary Examiner* — Daniel S Larkin
*Assistant Examiner* — Anthony W Megna Fuentes
(74) *Attorney, Agent, or Firm* — Purdue Research Foundation; Zhigang Rao

(57) ABSTRACT

A device and method for sensing including a sensor having a functional surface layer located to interact with a material to be sensed, the sensor having an output that produces a signal responsive one or more of inertia, stiffness, acceleration, pressure, radiation, chemical compounds, and biological compounds; and further including electronics including: an input coupled to the sensor to receive a first signal therefrom; and a non-linearity provider that applies one or more non-linear operations to the input signal to generate a non-linear second signal.

4 Claims, 11 Drawing Sheets

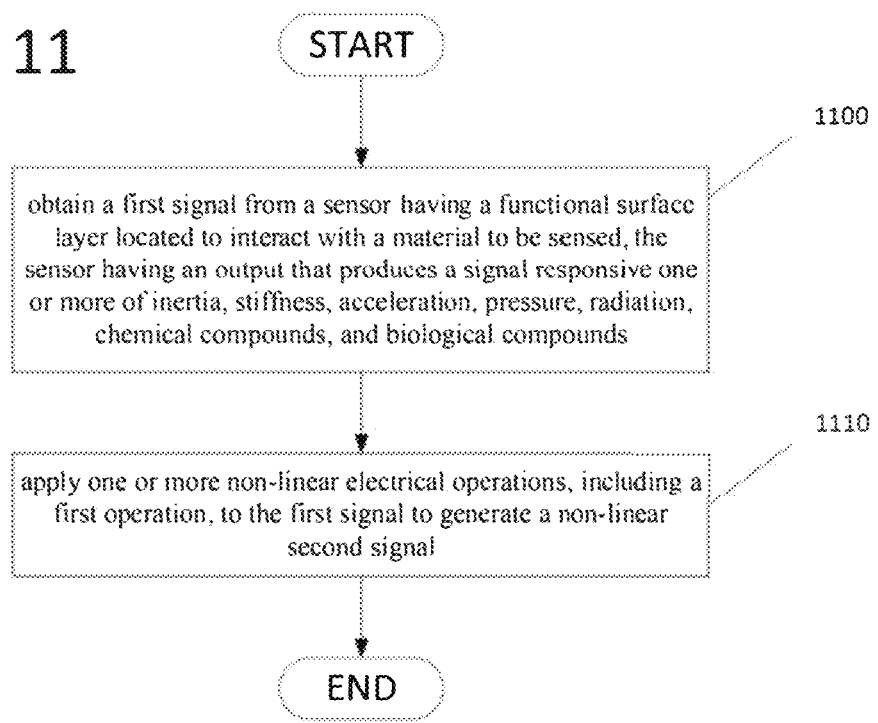

NONLINEAR MASS SENSORS BASED ON ELECTRONIC FEEDBACK AND METHODS OF USING THE SAME

STATEMENT REGARDING GOVERNMENT FUNDING

This invention was made with government support under 2013-ST-061-ED0001 awarded by the U.S. Department of Homeland Security. The government has certain rights in the invention.

PRIORITY

The present application is a continuation of U.S. patent application Ser. No. 14/973,262 filed Dec. 17, 2015, which claimed benefit of U.S. Provisional Application Ser. No. 62/093,747 filed Dec. 18, 2014, titled "NONLINEAR MASS SENSORS BASED ON ELECTRONIC FEEDBACK AND METHODS OF USING THE SAME," the priority of which is hereby claimed and the disclosure of which is hereby incorporated by reference in their entirety into this disclosure.

TECHNICAL FIELD

This disclosure relates to sensors capable of sensing mass, stiffness, and chemical or biological substances.

BACKGROUND AND SUMMARY

To date, many vibration-based sensing modalities have relied upon monitoring small shifts in the natural frequency of a system to detect structural changes (e.g. in mass or stiffness), which are attributable to the chemical, biological, or other types of phenomenon that are being measured. Often, this approach carries significant signal processing expense, due to the presence of electronics such as precision phase locked loops, when high sensitivities are required.

Microelectromechanical systems (MEMS) based sensing is an important area of transducer development and has been so for the past several decades. This importance stems from its potential to provide low-cost, scalable, and sensitive sensor alternatives based upon a wide variety of modalities. Resonant mode sensing is common in MEMS devices and is founded on correlating changes in the resonant behavior of structures and devices to identifiable parameter changes. Traditional methods in this area rely on linear or pseudo-linear sensing, which, in turn, rely on a shift in resonant frequencies of a vibrating structure to detect changes, either in the device structure or its surroundings. These methods have been successfully used to detect a number of chemical and other small masses (picograms and smaller in many cases), and have also found use in applications such as atomic force microscopy (AFM). It is important to note, however, that performing sensing in the linear mode with high sensitivity requires careful system design and may require significant cost or complexity to implement. It may require phase-locked loops, lock-in amplifiers, or other specialized equipment to perform the measurements and yield high sensitivity in frequency shift measurement.

Bifurcation-based mass sensing, on the other hand, is an approach to mass sensing that relies upon nonlinear behavior to produce large changes in amplitude when a mass change threshold is exceeded. Previous successful sensing efforts using bifurcation-based sensing have achieved high sensitivity albeit with the tradeoff being that the methods usually do not measure mass in a quantifiable manner aside from a certain threshold being exceeded.

Many microscale resonator devices capable of operating in a nonlinear regime commonly exhibit classical Duffing-like frequency responses. These devices can exhibit multiple coexisting steady-state solutions (stable and unstable), saddle-node bifurcations, and hysteretic behavior. A potential disadvantage to the state of the art in bifurcation-based sensing in microscale devices is the fact that in many cases the systems must be driven with magnitudes of excitation that may damage the device (18 V peak-to-peak excitation was required, where the device has a nominal breakdown voltage of 10 V). It is also worth noting that it may be possible to compensate for this by redesigning devices specifically for bifurcation-based sensing, but this may not be economical or practical for all applications (higher drive amplitudes require higher power circuitry to function, and this reduces applicability for battery powered, low power, mobile sensing).

One approach to tackling the aforementioned issue is to use feedback to produce a bifurcation at lower drive amplitudes. Prior work in this area has a bistable system structure rather than that of a Duffing resonator, but also had the disadvantage of the vibration actuation being separate (non-collocated). Likewise, nonlinear feedback methods have been suggested for use in MEMS devices in the past, but generally for reduction or elimination of nonlinear behavior. Notably the majority of this work has been performed either in simulation or on relatively low-frequency, macro-scale analogs of MEMS systems.

Most small-scale resonant sensor designs utilize linear phenomena for sensing. Specifically, they utilize chemomechanically-induced changes in mass or stiffness, to induce a change in resonant frequency and thus signal a detection event. These systems have proven utility in laboratory settings, but have not transferred to real-world, portable sensing applications, due to hardware constraints and the fixed sensitivity of the devices.

Thus a need exists for a sensors that can sense mass, stiffness, and chemical or biological substances which are more sensitive and tunable. It also desirable to have such sensing approaches allow for significantly reduced costs, improved reliability and enhanced robustness. It is further desirable to have sensing approaches that eliminate the need for customized mechanical/electrical designs.

According to a first embodiment of the present disclosure, a sensing device is provided including: a sensor having a functional surface layer located to interact with a material to be sensed, the sensor having an output that produces a signal responsive one or more of inertia, stiffness, acceleration, pressure, radiation, chemical compounds, and biological compounds; and further including electronics including: an input coupled to the sensor to receive a first signal therefrom; and a non-linearity provider that applies one or more non-linear operations to the input signal to generate a non-linear second signal.

According to another embodiment of the present disclosure, a method of generating a non-linear sensor response is provided including: obtaining a first signal from a sensor having a functional surface layer located to interact with a material to be sensed, the sensor having an output that produces a signal responsive one or more of inertia, stiffness, acceleration, pressure, radiation, chemical compounds, and biological compounds; and applying one or more non-linear electrical operations, including a first operation, to the first signal to generate a non-linear second signal.

According to another embodiment of the present disclosure, a computer readable media having non-transitory instructions thereon is provided, that when interpreted by a processor cause the processor to: obtain a first signal from a sensor having a functional surface layer located to interact with a material to be sensed, the sensor having an output that produces a signal responsive one or more of inertia, stiffness, acceleration, pressure, radiation, chemical compounds, and biological compounds; and apply one or more non-linear electrical operations, including a first operation, to the first signal to generate a non-linear second signal.

BRIEF DESCRIPTION OF DRAWINGS

FIG. 11 is a flowchart showing exemplary operation of a method of operating they systems of any of the previous FIGS.

DETAILED DESCRIPTION

Figure 1:
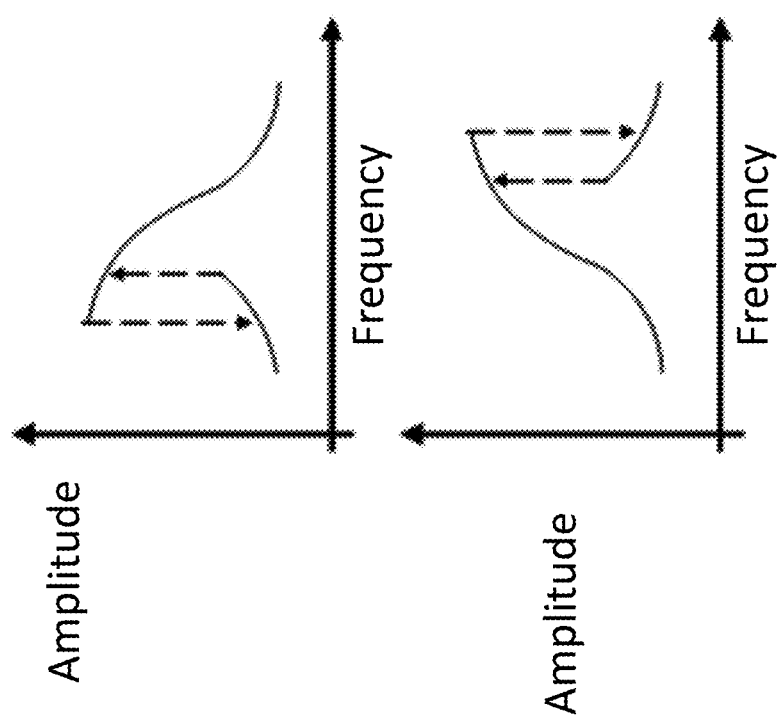
FIG. 1 shows examples of softening- and hardening-type Duffing resonator magnitude-frequency response curves.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

This disclosure details a new approach, based on nonlinear electronic feedback, through which conventional crystal resonator (e.g., quartz tuning forks) and related hardware, can be re-purposed as nonlinear mass, chemical, or biological sensors. The approach complements bifurcation-based sensing systems in that it retains the benefits of earlier systems over conventional, small-scale resonant sensor designs (including simplified electronics and high and tunable sensitivity), and furthers it by allowing for significantly reduced costs, improved reliability and enhanced robustness.

The above mentioned methods and systems find applicability in a variety of detection applications, some non-limiting examples of which are mass sensors, chemical sensors, and biosensors. The sensor systems described here can be configured for a variety of applications. As a non-limiting example, the sensors of this disclosure can be configured for trace vapor explosives detection.

The present work demonstrates a method for producing a tunable bifurcation in a system that would otherwise be well characterized with a linear model. The bifurcation used is that which arises in the frequency response of Duffing resonators, namely a saddle-node or cyclic-fold, and this method uses a very low cost device (quartz crystal tuning fork resonator) as the platform for demonstration. This device is a piezoelectric device, and thus, collocated actuation and sensing of the vibrational behavior is possible and relatively straightforward to achieve. The device requires a relatively high-frequency of operation to implement a non-linear feedback loop. Furthermore, standard digital control methods have significant disadvantages at such frequencies, especially from an implementation cost and phase-lag perspective. In order to show practical implementation on a class of devices that operates at the high frequencies typical of many MEMS devices, an analog feedback loop consisting of operational amplifiers, passive components, and multipliers capable of providing the cubic nonlinearity used to produce the bifurcation behavior with minimal phase lag are employed. Finally, the sensitivity and bifurcation points of the device are shown to be tunable via control of the feedback gain and the overall excitation amplitude. The type of Duffing-like response (hardening or softening) is made selectable, allowing for a versatile platform suitable for future Duffing-like bifurcation-based devices. Furthermore, while the present disclosure discusses primarily feedback systems, it should be understood that embodiments are envisioned where the provided response is achieved through feed-forward systems that repeat processing operations or apply different processing operations.

Design Concept

A) Sensing Strategy: Bifurcation-based mass sensing relies upon nonlinear behavior to produce large changes in amplitude when a mass change threshold is exceeded. Duffing resonators have a characteristic frequency response which qualitatively depends on whether the resonator is hardening or softening as shown in FIG. 1. When performing a frequency sweep on a softening-type Duffing resonator, when the frequency is increasing, the system follows one trajectory until the bifurcation frequency, and then it jumps to the other stable trajectory. This occurs when the frequency is decreased as well, but the jump frequencies are different for the increasing and decreasing cases. If the excitation frequency is just below the bifurcation frequency, and the mass of the device increases, the bifurcation frequency decreases, and if it passes the excitation frequency, a jump event will occur. This is the premise of the sensing method.

B) Theory of Operation: The softening Duffing resonator is a suitable model to approximate the dynamics of a real system suitable for sensing. Duffing resonators have a characteristic frequency response which qualitatively depends on whether the resonator is hardening or softening as shown in FIG. 1.

Figure 2A:
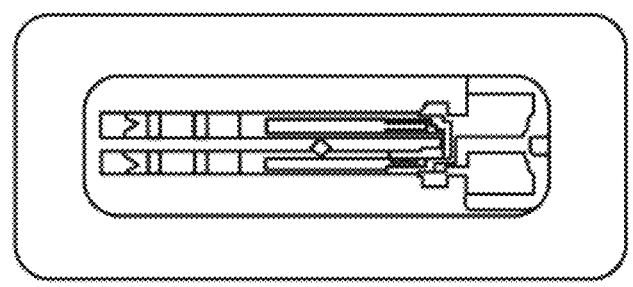
FIG. 2a shows an Epson FC-135 quartz tuning fork device
Figure 2B:
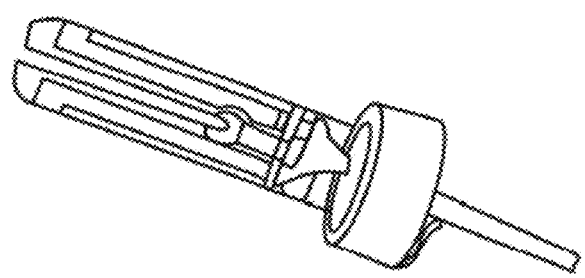
FIG. 2b shows an Abracon AB38T quartz tuning fork device.

In the present implementation, the demonstration device is a quartz tuning fork, a class of devices that is well-studied due to its use in timing devices, as well as in linear mass sensing and AFM applications. They are low cost due to being mass-produced, and have relatively tight tolerances and repeatability in a number of aspects of their fabrication. Two examples of quartz tuning fork devices are shown in FIG. 2. Considering the model of a quartz tuning fork crystal resonator as discussed in literature, the mechanical behavior of the crystal can be described by:

$$M\ddot{x}+h\dot{x}+kx=F(t). \quad (1)$$

Here, h is an equivalent damping term, M is an equivalent mass term, k is an equivalent stiffness term, x is the displacement (mechanical), and F (t) is the forcing term. This is a very simple second-order (linear) harmonic resonator model. It should apply to many possible devices, not just the aforementioned tuning forks.

In order for the device to behave as a Duffing-type system, a nonlinearity (such as a cubic non-linearity) is introduced. This nonlinearity can be added to the system via feedback, since F(t) is prescribed externally. Therefore, if F(t) is chosen such that $$F=F^*(t)-\alpha x^3, \quad (2)$$

then the resulting system equation becomes:

$$M\ddot{x}+h\dot{x}+kx+\alpha x^3=F^*(t). \quad (3)$$

In this case, F*(t) will be a sinusoidal input $A\sin(\omega t)$. The Duffing response can now be tuned by controlling the feedback gain $\alpha$.

In order to measure the effective position of the sensor, x, the piezoelectric nature of the device is exploited. The piezoelectric characteristics of the quartz material can also be used to simultaneously provide the excitation to the device. Thus, the device can be driven by a summing amplifier that adds an input excitation $V_{IN}$ (t) with the desired cubic feedback. The drive amplifier will excite the crystal through a transimpedance circuit with high gain, to produce a voltage proportional to the current passing through the crystal due to the drive input. This voltage, $V_{TI}$, is therefore proportional to $\dot{x}$. To produce a voltage proportional to x, VT I is integrated, then passed through a high-pass filter (HPF) to eliminate DC offset. Following the filtering, the output $V_X$ is proportional to x, and the quantity is passed through two analog multipliers in order to create a value proportional to $x^3$. This is passed through an inverter, and either the inverted cubed signal or the original cubed signal is passed through a non-inverting gain amplifier to produce a voltage proportional to $\alpha x^3$ which is then summed into the input excitation to complete the feedback loop. The design schematic can be seen in FIG. 3.

Theoretically, the method detailed above should be applicable as either an analog or digital embodiments. However, such resonator systems and their nonlinear behavior are generally phase-sensitive. For slower systems (in terms of natural frequency and bifurcation frequencies) digital design may be practical. However, for the crystals used in this sensing platform, with a resonant frequency close to 32.760 kHz, sampling at the "rule-of-thumb" of 20 times the nominal control frequency for feedback control applications would introduce a phase lag of approximately 18 degrees, which is quite significant, and would likely not allow desired results. Even sampling at 100 times the frequency would introduce 3.6 degrees of phase lag, assuming that the output can be produced within one sampling period. In addition, without careful smoothing and filtering, DAC outputs may introduce quantization noise that may cause premature bifurcation. Therefore, from the perspective of design practicality, cost, and performance, an analog embodiment is discussed.

Figure 3:
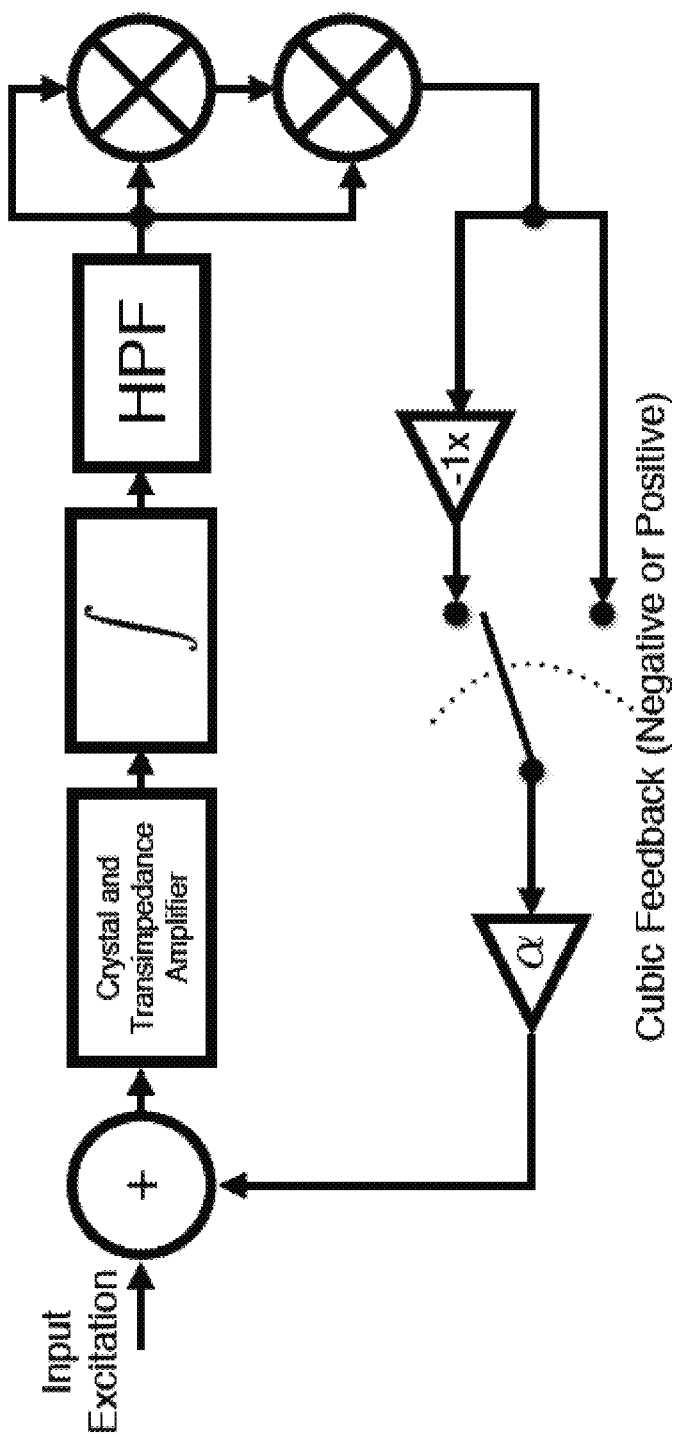
FIG. 3 is a schematic representation of the design concept.

The design concept illustrated in FIG. 3 can be realized with discrete electronic components, programmable electronic devices, application specific integrated circuits (ASICs), micro-controllers and combination of software/hardware implementations.

C): Design Guidelines: The circuit can be considered as having three main subsystems: the actuation and sensing subsystem, the filtering subsystem, and the (cubic) feedback generation. Frequency ranges and excitation voltage ranges of interest depend on the device used as the sensing platform. As an example, most commercially available quartz tuning forks range in operating frequency from 10 kHz to 200 kHz, while other quartz resonators can operate up to the hundreds of MHz or higher range (using overtones, and not in tuning fork geometries). Voltage ranges of operation span from less than one volt to tens of volts.

The methodology discussed herein that is used to produce the bifurcation is applicable to a wide range of devices when one has direct control over the sensing and actuation circuitry. The embodiment discussed by the present disclosure provides design guidelines for working with piezoelectric, collocated sensing and actuation devices.

Sensing and Actuation Subsystem: Collocated sensing and actuation is a well-studied area in structural mechanics and control, and in particular has been very carefully studied in the area of AFM and scanning probe microscopy (SPM) systems, where quartz tuning forks are used as actuation and sensing elements. One method of simultaneously driving and sensing the behavior of a piezoelectric device is that of driving it through a bridge circuit which can be either an active or passive bridge. As with most bridge circuits, tuning is generally required after construction in order to get the desired performance out of the circuit, due to tolerances and parasitic capacitance and inductance. A feature of the active bridge circuit is the ability to remove the asymmetry present in the frequency response that arises from the shunt capacitance as seen in the commonly-used Butterworth-Van Dyke model, along with providing high sensitivity and low noise. However, low noise and high sensing gain can be achieved without the use of shunt capacitance compensation, if one is willing to accept the asymmetry in the response. In the present exemplary embodiment, a simple transimpedance amplifier configuration is used.

In order to design the transimpedance amplifier stage the equivalent series resistance (ESR) of the device is characterized. The ESR is the equivalent impedance of the crystal resonator measured at the electrical resonant frequency. Based on the ESR (provided by the manufacturer or determined via impedance measurement), the approximate current consumption of the device (root-mean squared (RMS) should be sufficient for this purpose) can be estimated for a given input voltage magnitude. The maximum current consumption should occur near electrical resonance. In order to provide a useful signal-to-noise ratio for later stages, a transimpedance gain (feedback resistor) can be chosen such that the voltage output of the transimpedance stage uses a reasonable fraction (10% or more) of the dynamic range. Photodiode measurement transimpedance circuits deal with a similar range of currents and design considerations for them are widely available—the same guidelines apply here, with low input bias and input offset current being a used design parameter. The output of the transimpedance stage should drive the filtering subsystem.

Filtering Subsystem:

As discussed previously, the filtering subsystem contains an integrator and a high-pass filter circuit. The integrator has a sufficiently wide bandwidth for the system, with low distortion and the useful integration frequency range spanning at least a decade below the operating frequency and allowing attenuated integration of the third harmonic. Integrator design is a standard op amp design technique, as is high-pass filter design. The design uses an operational amplifier with a low input offset voltage but sufficient bandwidth to meet requirements.

Nonlinear Feedback Subsystem:

The nonlinear feedback subsystem consists of gain and/or attenuation circuits, the circuitry to produce the, exemplary, cubic signal, and finally the summing amplifier which adds together the excitation and the nonlinear feedback. Gain and attenuation circuits can be created using standard operational amplifier designs, with adjustable gains useful for tuning the bifurcation response. Adjustable gain and attenuation can be conveniently built into the circuit through the use of potentiometers, or alternatively, through additional multiplier elements, variable gain amplifiers (VGAs) or programmable gain amplifiers (PGAs). The option of adding a gain or attenuating intermediate signals allows constraining the input ranges of the subsequent elements to avoid saturation while maximizing dynamic range. One method of doing this is to drive the tuning fork to resonance with a desired drive amplitude input excitation (a frequency sweep may be required to find it) and then observe intermediate signals, tuning them such that they do not saturate but take up a significant fraction of the dynamic range of the amplifiers and multipliers.

The drive amplifier chosen should be able to drive highly capacitive loads in a stable manner. Many operational amplifiers have maximum capacitive loading for stable operation provided in their specifications data, and this should be compared to the measured impedance of the device being driven. The drive amplifier is configured as a summing amplifier to add together the input excitation signal and the cubic feedback signal, which should have some option of attenuation/gain control in order to tune the feedback gain.

Figure 4:
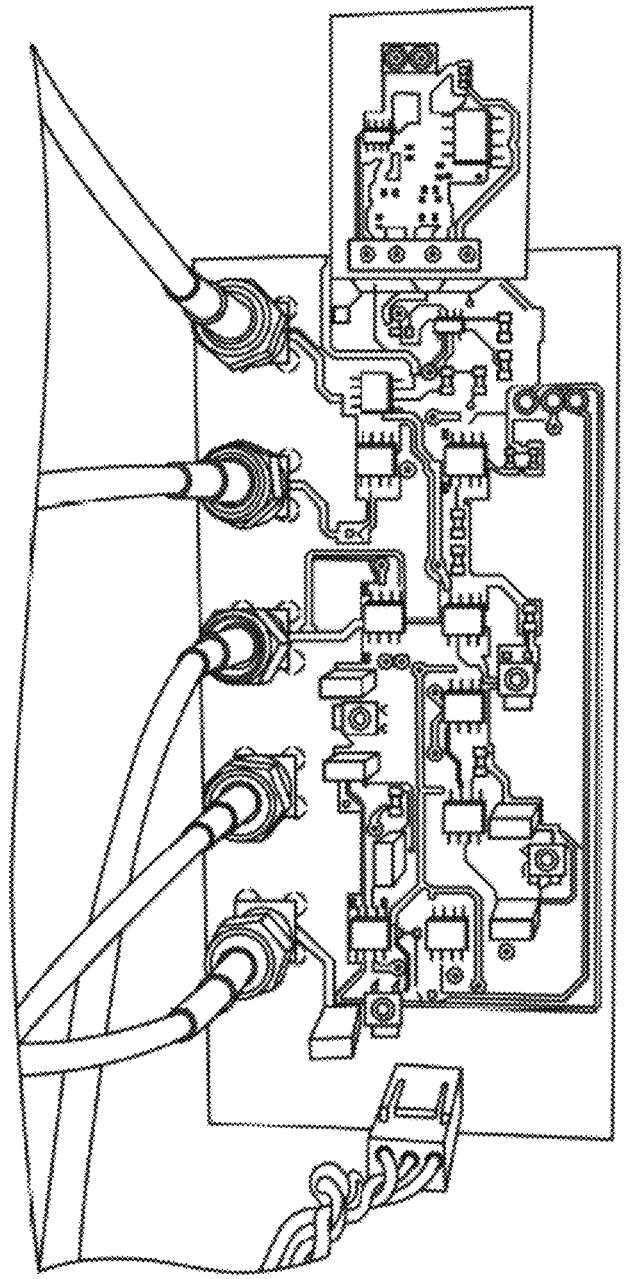
FIG. 4 shows an implementation of the design according to the present disclosure.
Figure 5:
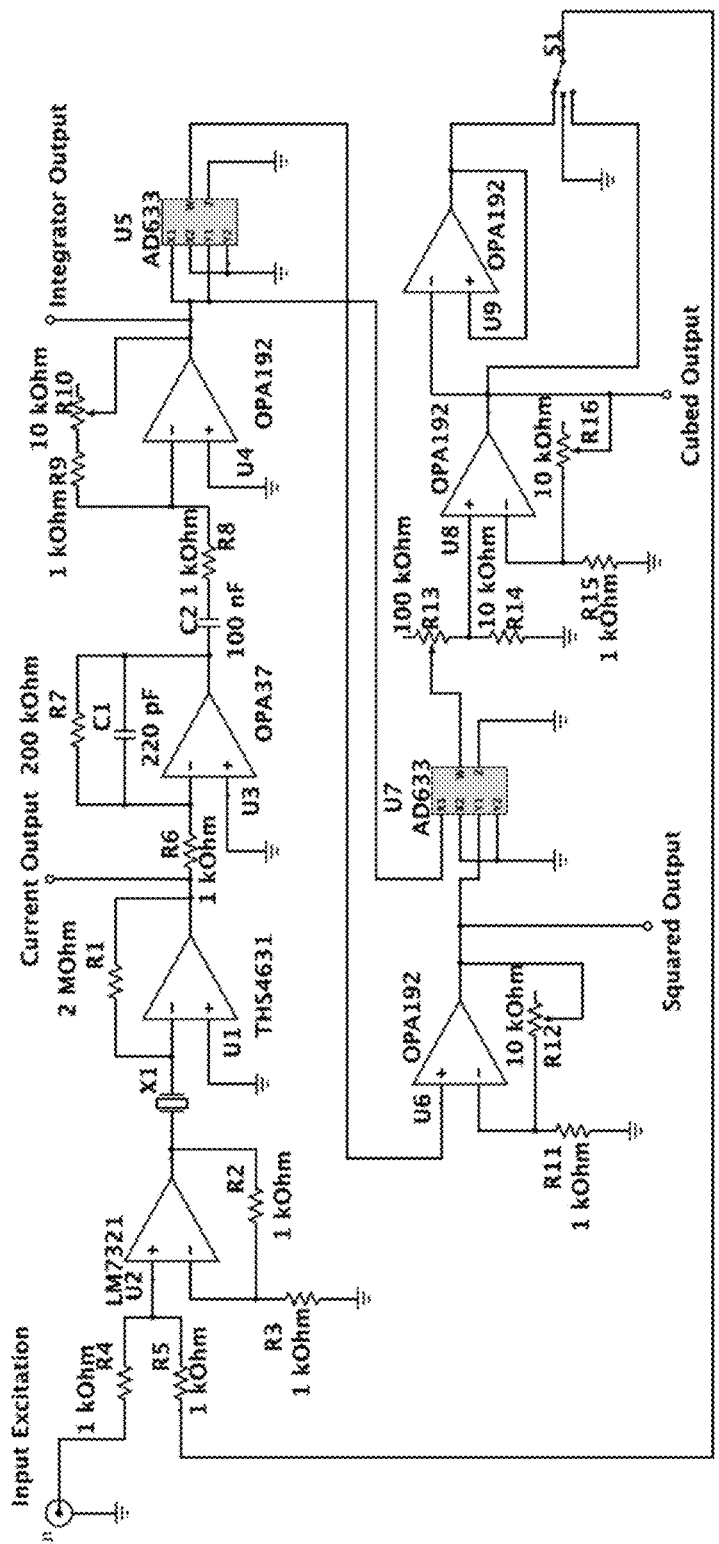
FIG. 5 is a detailed circuit diagram of an implementation of the design.

Implementation:

The drive/summing amplifier is illustratively a LM7321 from Texas Instruments that provides for driving reactive and capacitive loads and sufficient bandwidth, and the transimpedance amplifier is illustratively a THS4601 from Texas Instruments, a very high speed FET-input amplifier, that operates with low input bias current and high bandwidth, which allows for a sufficient bandwidth at the operating frequency while having a high transimpedance gain of 2 MΩ. The integrator and subsequent operational amplifiers used (in the high-pass filter and for buffer amplifiers for observing signals) are illustratively OPA192 low-noise precision amplifiers from Texas Instruments (having sufficient bandwidth for the tasks) and the utilized multipliers are illustratively AD633 (from Analog Devices) devices. The electronics were laid out on a printed circuit board (PCB) with multiple diagnostic outputs for observation with an oscilloscope, including the transimpedance amplifier output, the integrator and high-pass filter output, the squared output, and the cubic output. Potentiometers and non-inverting amplifiers control the feedback gains and gains between multiplier stages, and 0.1" pitch header jumpers are used to allow the potentiometer values to be measured to determine the gain at the individual amplification stages. In addition, a jumper allows selection of positive, negative, or no cubic feedback into the summing amplifier. The implementation is shown in FIG. 4, with the detailed circuit diagram shown in FIG. 5. The implementation is provided power from a standard lab dual voltage power supply supplying +15V, −15V, and ground. The input excitation signal is illustratively provided using an Agilent 55321 waveform generator, and the output measurements are illustratively taken on a Agilent MSO-3104A 4-channel oscilloscope. Both the waveform generator and the oscilloscope are connected to a host PC utilizing USB, and they are correspondingly illustratively controlled via a LabVIEW script and drivers provided by National Instruments and Agilent.

The desired frequency response structure is produced by tuning the feedback potentiometers, starting at the lowest gain values, and then slowing increasing them while sweeping the frequency of the signal driving the device.

This particular system implementation has the transimpedance board isolated from the analog signal processing board, in order to facilitate the use of multiple types of devices for measurement (the measured device is mounted to the transimpedance amplifier board along with the drive amplifier to minimize trace length and therefore parasitic inductance, capacitance, and impedance while driving the crystal. Certain through-hole crystals (for example, Abracon Corporation Model AB38T) and surface mount crystals (for example, Ep-son FC-135) are supported, depending on the footprint.

Behavior is characterized by performing frequency sweeps of the input excitation. The output waveform (the integrator output, representing x, is measured on the oscilloscope, and the frequency, input excitation magnitude, and output excitation magnitude are all measured using the oscilloscope with averaging of 16 waveforms, in addition to adaptively switching the scale of the oscilloscope at each reading in order to maximize resolution. Illustratively, the bifurcation frequency is in the 32.700-32.800 kHz range, so a coarse sweep is initially performed with frequency steps of 2 Hz. After a bifurcation is localized, the frequency steps around that point are made more fine (0.1 Hz) and the frequency range over which measurements are taken is tightened in order to speed up the measurements. A dwell time of 3 seconds per measurement was exemplarily used in order to allow the system to reach a steady state after each frequency change. The sweeps are performed both increasing and decreasing in order to appropriately characterize hysteresis. In addition, in a number of the examples, the magnitudes were changed between sweeps in order to determine the effect of input excitation magnitude. Feedback gain was also varied in some of the tests.

To reproduce results consistently, the frequency step sizes are consistent. A frequency jump produced by the signal generator near the bifurcation, if too large, may cause a bifurcation jump event to the other branch. A larger frequency jump will cause the system to jump more easily. As discussed earlier, for the disclosed example, the frequency step was 0.1 Hz around the bifurcation point, but depending on the sensitivity of the device a lower or higher step size may be appropriate. It is also important to make certain that the function or signal generator used to generate the excitation input should operate in a phase-continuous manner when changing frequency, as non-phase continuous-behavior can very briefly introduce broad-spectrum excitation, which can cause a bifurcation event as well. In general, noise can cause the system to jump unexpectedly as well, so noise-reduction practices such as ground planes, shielded/coaxial cabling, and relatively clean power supplies are illustratively used. The amount of noise that can be tolerated is device and application dependent, related to desired sensitivity of the bifurcation and frequency resolution of excitation and measurement equipment.

The following results were generated using an Abracon Corporation model AB38T tuning fork crystal designed for clock circuits operating at 32.768 kHz.

Figure 6:
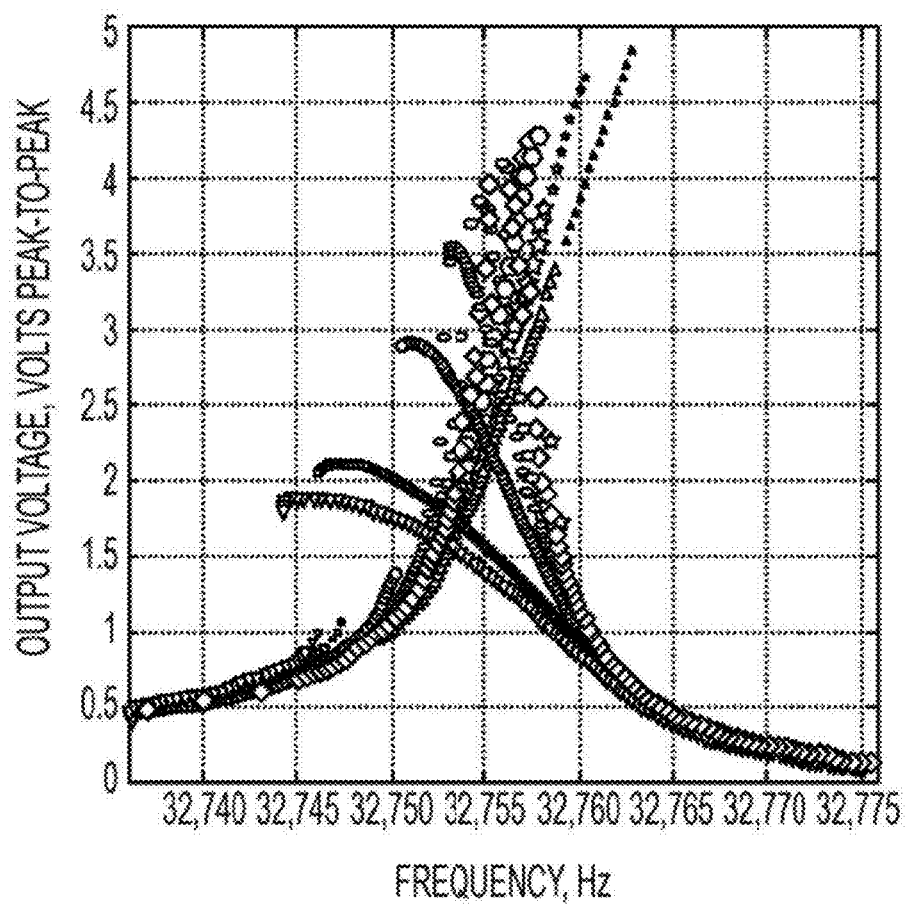
FIG. 6 is a demonstration of the tuning of the Duffing-like bifurcation response, with both hardening and softening characteristics.

Generation of Bifurcations and Tunability:

In order to demonstrate tunability of the response, the input excitation magnitude was held constant at 130 mV peak-to-peak. The feedback jumper was left unconnected so that there would be no feedback contribution to the input excitation. Thus, the expected response is a linear one. Then the system was connected to negative feedback, and the system characterized with two values of the feedback gain. Following this, the system was switched to positive feedback, and the system was characterized again with multiple values of the feedback gain. The results are plotted in FIG. 6 and demonstrate the ability of this approach to produce a bifurcation that can be tuned based on system requirements by modifying the feedback gain. In the experimental results, the tuning forks have a portion of the housing removed to expose them to air. While this increases effects associated with dissipation, it is a more realistic system for the use of bifurcation-based sensing in air. For all of the frequency response plots in this paper, the data points represent the peak-to-peak magnitude of the response signal, with dots representing data acquired during sweeps with increasing frequency, and the circles representing data acquired during sweeps with decreasing frequency.

Figure 9:
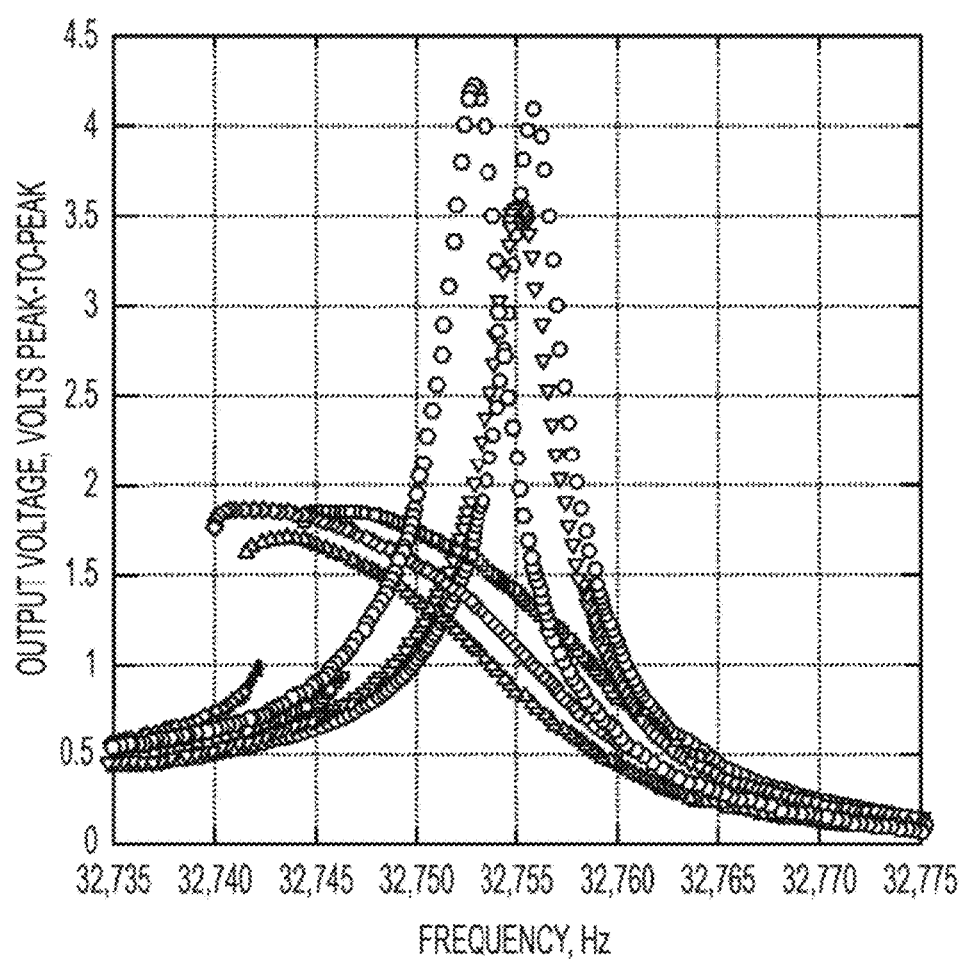
FIG. 9 shows softening responses of three different AB38T tuning fork crystal devices, with their respective linear responses also shown.

Repeatability experiments were performed by using three different AB38T tuning forks (again, removed from the housing) and then performing a linear response characterization (discrete frequency sweep) with fixed 75 mV peak-to-peak input excitation. The nonlinear feedback was then connected to the circuit with the same input excitation magnitude, and the same feedback gain (softening) for each device. Trials with three devices are shown in FIG. 9. The effect is repeatable with the same gains for the same devices producing a similar (though not identical) response. The responses could be made closer by tuning the gains further to match and compensate for device-to-device variation.

Figure 7:
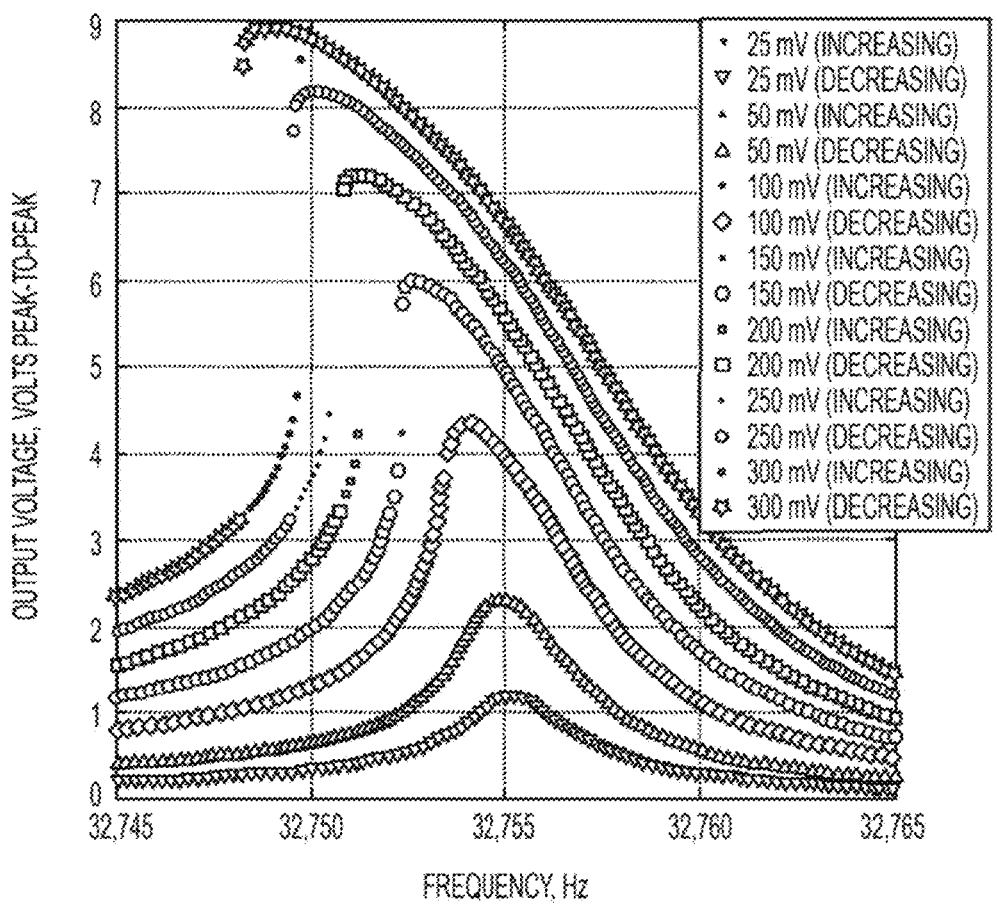
FIG. 7 is a demonstration of the tuning of the Duffing-like frequency response in the softening feedback mode, with a fixed gain and increasing excitation amplitude.
Figure 8:
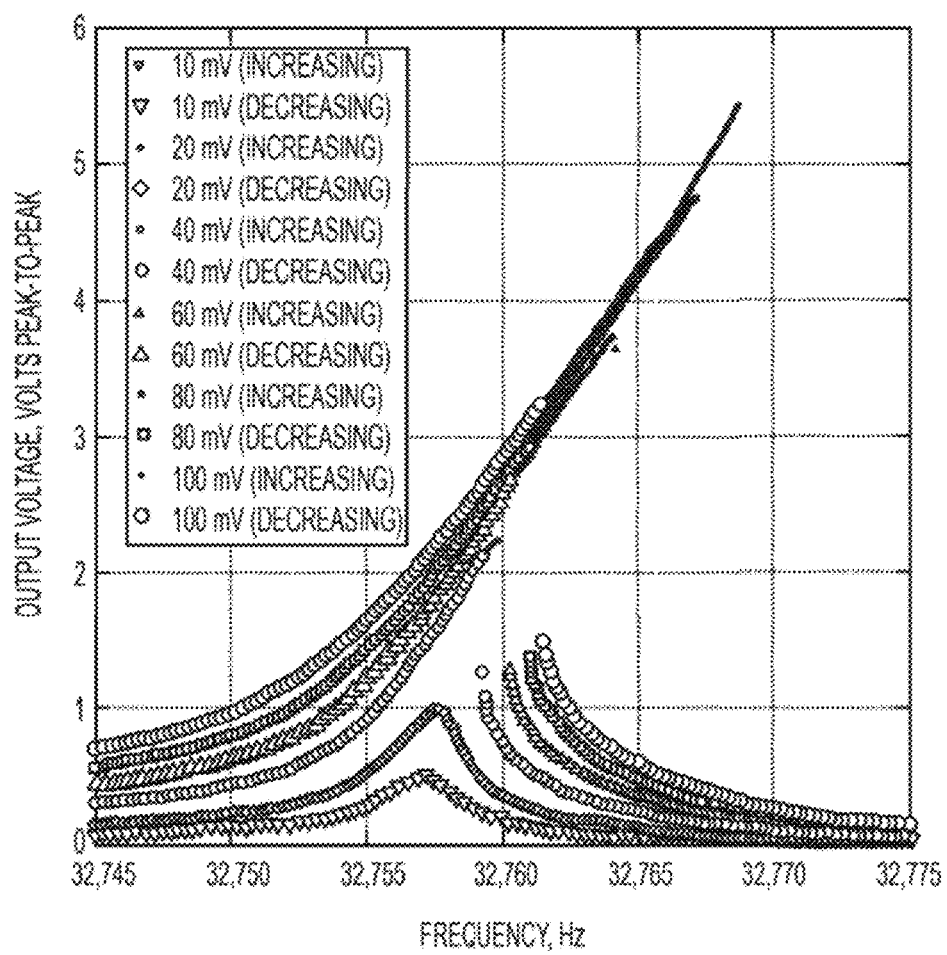
FIG. 8 is a demonstration of the tuning of the Duffing-like frequency response in the hardening feedback mode, with fixed gain and increasing excitation amplitude.

To further demonstrate the Duffing-like behavior of the system, the feedback gain was held both a softening case (FIG. 7) and a hardening case (FIG. 8). In each case, the input excitation magnitude was increased between frequency sweeps, and the amplitude-dependent response typical of Duffing resonator systems is clearly present. In the case of the softening case, in order to have a bifurcation, it is clear that for this particular gain (set by the potentiometer) the system requires a minimum excitation amplitude of approximately 100 mV peak-to-peak in order to have a bifurcation. Similarly, the minimum excitation amplitude required for bifurcation in the hardening response for this particular gain is approximately 40 mV peak-to-peak. Both of these values are generally within safe operational ranges for the device.

Figure 10:
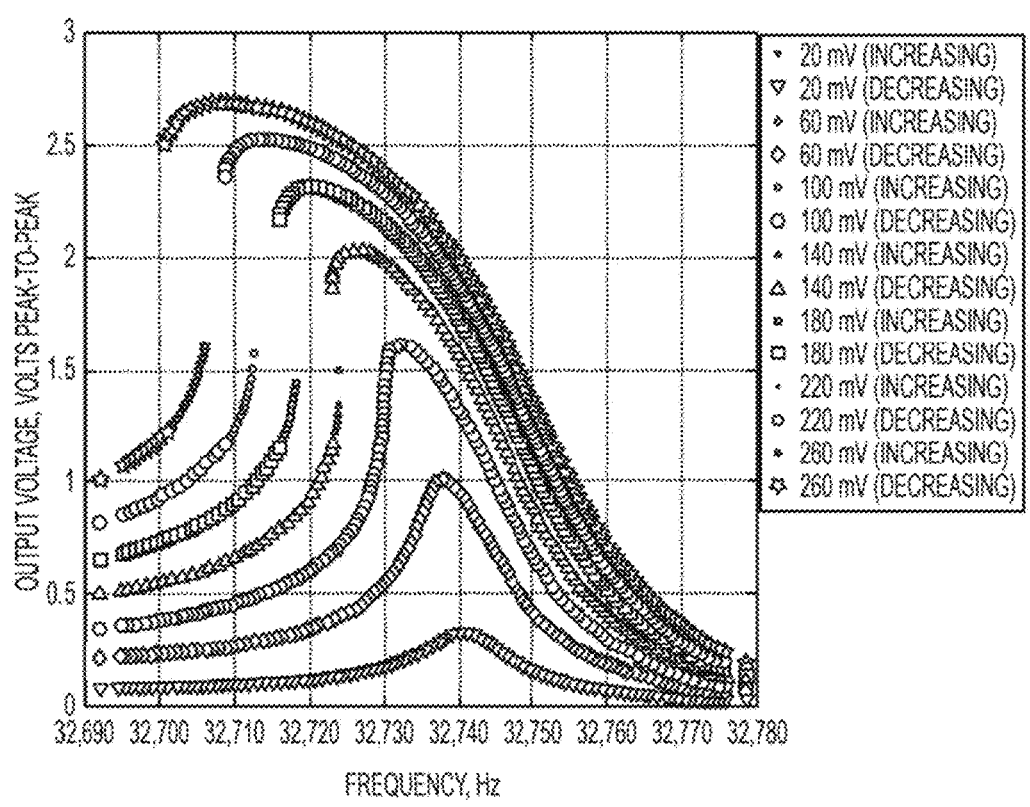
FIG. 10 is a demonstration of tuning of Duffing-like frequency response in the softening mode for the Epson FC-135 tuning fork crystal, with a fixed gain and increasing excitation amplitude.

Applicability to Multiple Crystal Types: After demonstrating the method successfully with Abracon Corporation AB38T devices, an attempt was made to determine applicability on other devices using the same circuit. An Epson FC-135 device was soldered to the transimpedance amplifier board in the appropriate footprint and was subjected to a softening-mode feedback with varying input amplitude, and the results, shown in FIG. 10, indicate that the method is adaptable and applicable to a range of devices. Comparing the two devices, the FC-135 is approximately ½ to ⅓ the size of the AB38T tuning fork, with significant difference in the aspect ratio of tine length to tine thickness, required to maintain the same operating frequency. The electrode configuration and tine shape also have some significant differences in design. The equivalent series resistance is also higher in the FC-135 devices (approximately 80 kΩ as compared to approximately 40 kΩ). Despite the differences, the devices behave similarly enough to allow the bifurcation response to be created on the FC-135 as well, with some tuning of feedback and internal multiplier and filter gains.

In this disclosure, a system and circuit design is presented that creates a Duffing-like resonator system using off-the-shelf, relatively low-cost components that creates an opportunity for low-cost implementation of bifurcation-based applications. The bifurcations are tunable, and are repeatable on a device to device basis for multiple types of quartz crystal resonators. As another feature of this method, the input excitation required is significantly lower than much of the prior art when producing the bifurcation behavior.

Accordingly, at a high level, the present disclosure includes a method including obtaining a first signal from a sensor having a functional surface layer located to interact with a material to be sensed, with the sensor having an output that produces a signal responsive one or more of inertia, stiffness, acceleration, pressure, radiation, chemical compounds, and biological compounds, block 1100.

The method further includes applying one or more non-linear electrical operations, including a first operation, to the first signal to generate a non-linear second signal, block 1110.

It should be further appreciated that while the system is described as having a linear sensor response provided to the processing (feedback) subsystem, embodiments are also envisioned where non-linear response sensors are used and non-linear response signals are provided to the processing (feedback) subsystem.

While the present disclosure has been described with reference to certain embodiments, it will be apparent to those of ordinary skill in the art that other embodiments and implementations are possible that are within the scope of the present disclosure without departing from the spirit and scope of the present disclosure. Thus, the implementations should not be limited to the particular limitations described. Other implementations may be possible. It is therefore intended that the foregoing detailed description be regarded as illustrative rather than limiting. Thus, this disclosure is limited only by the following claims.

The invention claimed is:

1. A method for mass sensing, wherein the mass sensing comprises: obtaining a first linear signal generated through contacting a material to be sensed with a functional surface layer of a mass sensor; applying one or more non-linear electrical operations through a non-linearity feedback subsystem to said first linear signal to generate a second non-linear signal, wherein said one or more non-linear electrical operations are capable of generating bifurcation in said second non-linear signal when said one or more non-linear electrical operations are applied to the first linear signal; and wherein the second non-linear signal is summed to an excitation signal to excite the mass sensor.

2. The method of claim 1, wherein said second non-linear signal comprises cubic non-linearity.

3. The method of claim 1, said first linear signal is passed through a filter subsystem before said one or more non-linear electrical operations.

4. The method of claim 1, wherein said second non-linear signal is combined with the said first linear signal to generate a third non-linear signal, wherein said third non-linear signal is adjustable through adding a gain or an attenuation of said second non-linear signal to provide a desired range of said third non-linear signal.

* * * * *